(12) United States Patent
Rezvani et al.

(10) Patent No.: US 11,250,625 B1
(45) Date of Patent: *Feb. 15, 2022

(54) MARKER AIDED THREE-DIMENSIONAL MAPPING AND OBJECT LABELING

(71) Applicant: Alarm.com Incorporated, Tysons, VA (US)

(72) Inventors: Babak Rezvani, Tysons, VA (US);
Ahmad Seyfi, Tysons, VA (US);
Donald Madden, Columbia, MD (US);
Gang Qian, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,403

(22) Filed: Sep. 3, 2020

Related U.S. Application Data (63) Continuation of application No. 15/979,096, filed on May 14, 2018, now Pat. No. 10,769,844.

(60) Provisional application No. 62/505,806, filed on May 12, 2017.

(51) Int. Cl.
| | |
|---|---|
| *G06T 17/05* | (2011.01) |
| *G06K 9/00* | (2006.01) |
| *G06T 7/70* | (2017.01) |
| *B64C 39/02* | (2006.01) |
| *B64D 47/08* | (2006.01) |

(52) U.S. Cl.
CPC ............ *G06T 17/05* (2013.01); *B64C 39/024* (2013.01); *B64D 47/08* (2013.01); *G06K 9/00664* (2013.01); *G06T 7/70* (2017.01); *B64C 2201/123* (2013.01); *B64C 2201/141* (2013.01)

(58) Field of Classification Search
CPC ......... G06T 17/05; G06T 7/70; B64C 39/024; B64C 2201/123; B64C 2201/141; B64D 47/08; G06K 9/00664
See application file for complete search history.

(56) References Cited

U.S. PATENT DOCUMENTS

| | | | | |
|---|---|---|---|---|
| 10,102,758 | B1 * | 10/2018 | Beaurepaire | G06Q 10/08355 |
| 10,155,587 | B1 * | 12/2018 | Tang | B64C 27/08 |
| 10,239,638 | B1 * | 3/2019 | Cohen | B64F 1/00 |
| 10,453,022 | B2 * | 10/2019 | Gil | B65G 1/06 |
| 10,472,090 | B2 * | 11/2019 | Kessler | B64D 47/08 |
| 10,514,690 | B1 * | 12/2019 | Siegel | G01C 23/00 |

(Continued)

*Primary Examiner* — Santiago Garcia
(74) *Attorney, Agent, or Firm* — Fish & Richardson P.C.

(57) ABSTRACT

Methods, systems, and apparatus, including computer programs encoded on a storage device, for generating a three-dimensional map of a property. The method includes storing at least a portion of an initial map modification data structure, receiving an instruction that instructs the robotic device to initiate property mapping, obtaining image data describing a portion of the property that is mounted to the robotic device, analyzing the obtained image data to determine whether the image data depicts a marker, in response to a determination that the obtained image data depicts a marker, determining the pose of the camera that is mounted to the robotic device, updating the initial map modification data structure using the pose of the camera that is mounted to the robotic device, obtaining an initial three-dimensional map of the property; and modifying the initial three-dimensional map of the property based on the updated map modification data structure.

20 Claims, 5 Drawing Sheets

(56) References Cited

U.S. PATENT DOCUMENTS

| | | | |
|---|---|---|---|
| 10,526,094 B2 * | 1/2020 | Cheng | B64F 1/007 |
| 10,543,984 B1 * | 1/2020 | Alduaiji | B65G 67/04 |
| 2014/0005933 A1 * | 1/2014 | Fong | G05D 1/0088 |
| | | | 701/447 |
| 2015/0032295 A1 | 1/2015 | Stark et al. | |
| 2015/0185027 A1 * | 7/2015 | Kikkeri | G01C 25/00 |
| | | | 701/533 |
| 2016/0364989 A1 | 12/2016 | Speasl et al. | |
| 2017/0031369 A1 | 2/2017 | Liu et al. | |
| 2017/0091993 A1 * | 3/2017 | Andrew | G06F 3/04812 |
| 2017/0092109 A1 * | 3/2017 | Trundle | B64D 47/08 |
| 2017/0225321 A1 * | 8/2017 | Deyle | B25J 9/1679 |
| 2017/0357273 A1 * | 12/2017 | Michini | G05D 1/106 |
| 2017/0364924 A1 * | 12/2017 | Bennett | H04L 67/104 |
| 2018/0018805 A1 * | 1/2018 | Kutliroff | G06T 7/90 |
| 2018/0094935 A1 | 4/2018 | O'Brien et al. | |
| 2018/0200884 A1 * | 7/2018 | Perets | B25J 9/163 |
| 2018/0204470 A1 * | 7/2018 | Rezvani | G08G 5/0034 |
| 2018/0231653 A1 * | 8/2018 | Pradeep | H04L 51/02 |
| 2019/0080170 A1 * | 3/2019 | Baca | G06K 9/00671 |
| 2020/0019156 A1 * | 1/2020 | Drew | G06T 7/74 |

\* cited by examiner

MARKER AIDED THREE-DIMENSIONAL MAPPING AND OBJECT LABELING

CROSS-REFERENCE TO RELATED APPLICATIONS

This application is a continuation of U.S. application Ser. No. 15/979,096, filed May 14, 2018, now allowed, which claims the benefit of the U.S. Provisional Patent Application No. 62/505,806, filed May 12, 2017 and entitled "Marker Aided Three-Dimensional Mapping and Object Labeling." The complete disclosures of all of the above patent applications are hereby incorporated by reference in their entirety for all purposes.

BACKGROUND

Conventional property monitoring systems can be used to monitor sensor data generated by one or more sensors installed at a property. In conventional systems, the property monitoring system, when armed, can trigger an alarm in response to sensor data generated by a contact sensor, motion sensor, or a glass break sensor indicating that a potentially unauthorized person has entered the property.

A drone may be configured to navigate to a location of the property based on the detected sensor data. The drone may navigate the property in a variety of different ways. For example, a drone may access a map of a property in the drone's memory, and use the map to navigate the property.

SUMMARY

The present disclosure is directed towards a method, system, apparatus, including computer programs encoded on a storage device, for generating a three-dimensional map of a property using a robotic device. The present disclosure solves multiple problems in the field of three-dimensional mapping by enabling a robotic device performing autonomous, or semi-autonomous, mapping of a property to detect surfaces of a property that are not easily detectable by typical drone-mounted mapping sensors. Such surfaces include, for example, glass walls, glass windows, closed doors, open doorways, stationary objects, moving objects, or the like.

In one innovative aspect, a robotic device is disclosed that includes one or more processors and one or more computer readable storage media storing instructions that, when executed by the one or more processors, causes the robotic device to perform operations. The operations may include storing at least a portion of an initial map modification data structure, receiving an instruction that is configured to instruct the robotic device to initiate property mapping, obtaining image data describing a portion of the property using a camera that is mounted to the robotic device, analyzing the obtained image data to determine whether the image data depicts one or more markers, in response to a determination that the obtained image data depicts one or more markers, determining a pose of the camera that is mounted to the robotic device, updating the initial map modification data structure using the pose of the camera that is mounted to the robotic device, obtaining an initial three-dimensional map of the property, and modifying the initial three-dimensional map of the property based on the updated map modification data structure.

Other aspects includes corresponding systems, methods, and computer programs to perform actions of methods defined by instructions encoded on computer storage devices.

These and other versions may optionally include one or more of the following features. For example, in some implementations, the pose of the camera that is mounted to the robotic device includes the position and orientation of the camera.

In some implementations, obtaining an initial three-dimensional map of the property may include obtaining an initial-three dimensional map of the property that was previously generated by the robotic device using mapping sensors mounted to the robotic device.

In some implementations, storing at least a portion of an initial map modification data structure may include storing a map modification data structure includes one or more marker identifiers that each have a corresponding object identifier and marker location.

In some implementations, receiving an instruction that is configured to instruct the robotic device to initiate property mapping may include receiving, by the robotic device and from a user device, an instruction that is configured to instruct the robotic device to initiate property mapping.

In some implementations, receiving an instruction that is configured to instruct the robotic device to initiate property mapping may include determining, by the robotic device, that a current time and date satisfies a predetermined time and date that is stored in the one or more computer readable storage media as a condition that, when detected, triggers an instruction to be provided to the robotic device from the one or more computer readable storage media that instructs the robotic device to initiate property mapping.

In some implementations, the operations may further include obtaining, in response to a determination that the obtained image data depicts one or more markers, encoded data from the image of the marker, and decoding the encoded data obtained from the image of the marker to obtain data that identifies an entry in the map modification data structure.

In some implementations, determining, based on the identified entry in the map modification data structure, that the initial three-dimensional map should be adjusted to include a label identifying one or more features of the property that is undetectable (i) by the camera that is mounted to the robotic device or (ii) by the robotic device's mapping sensors, wherein modifying the initial three-dimensional map of the property based on the updated map modification data structure may include labeling a particular portion of the initial three-dimensional map of the property using data stored in the updated map modification data structure.

In some implementations, the operations may further include determining, based on the identified entry in the map modification data structure, that the initial three-dimensional map should be adjusted to identify a glass window, and determining, based on the identified entry in the map modification data structure, dimensions of the glass window, wherein modifying the three-dimensional map of the property comprises labeling a portion of the three-dimensional map where the glass window is located based on the determined dimensions.

In some implementations, the operations may further include determining, based on the identified entry in the map modification data structure, that the initial three-dimensional map should be adjusted to identify a glass wall and determining, based on the identified entry in the map modification data structure, dimensions of the glass wall, wherein modifying the three-dimensional map of the property may include labeling a portion of the three-dimensional map where the glass wall is located based on the determined dimensions.

In some implementations, the operations may further include determining, based on the identified entry in the map modification data structure, that the initial three-dimensional map should be adjusted to identify a doorway, and determining, based on the identified entry in the map modification data structure, dimensions of the doorway, wherein modifying the three-dimensional map of the property may include labeling a portion of the three-dimensional map where the doorway is located based on the determined dimensions.

In some implementations, the operations may further include obtaining a plurality of images of a portion of the property, determining that each image of the plurality of images depicts the first marker in a different location of the property, and identifying a volumetric radius that envelopes each of the different locations of the object that includes the first marker, wherein modifying the three-dimensional volumetric map of the property may include labeling a portion of the three-dimensional map where the volumetric radius is located.

In some implementations, the operations may further include obtaining a plurality of images of a portion of the property, determining that each image of the plurality of images depicts the first marker of the blade of the ceiling fan in multiple different location, and identifying a volumetric radius that envelopes each of the different locations of the blade of the ceiling fan that includes the first marker, wherein modifying the three-dimensional map of the property may include labeling a portion of the three-dimensional map where volumetric radius is located.

In some implementations, the robotic device may include a quad-copter helicopter drone.

These and other implementations are described in more detail in the detailed description and accompanying drawings.

DETAILED DESCRIPTION

A system and method for facilitating indoor 3D mapping using a robotic device such as a flying drone is disclosed. The robotic device may be part of a connected-home monitoring system and be configured to generate a map of the property associated with the monitoring system. Alternatively, the robotic device may be a tool used by a third party to facilitate indoor 3D mapping of a property. 3D mapping of a property may begin with transmitting an instruction to the robotic device to initiate property mapping.

The robotic device may generate a 3D map of an indoor portion of a property using data obtained from one or more markers installed in one or more portions of the property. The markers may be installed on surfaces (e.g., glass surfaces) or objects (e.g., doors, paintings, chairs, desks, beds, or the like) that may not be readily detectable by the robotic device mapping sensors alone. The robotic device may navigate through the property using one or more mapping sensors to collect data about the property. The collected data may include 3D volumetric data and visual images. The robotic device may generate an initial map of the property based on the collected 3D volumetric data. Then, the robotic device may analyze visual images for the presence of markers, and modify the initial map of the property based on data obtained from one or more markers detected in the visual images. Modifying the initial map may include altering the initial map to include surfaces and objects marked by the markers which cannot be detected independent of the markers by the robotic device's mapping sensors.

Though the system and method of the present disclosure is described with reference to a robotic device such as a quad-copter helicopter drone, the present disclosure need not be so limited. For example, any type robotic device such as a land-based drone may also be used. Alternatively, the system and method of the present disclosure may also be performed using a handheld device such as a mobile phone or other hand-held mapping devices.

Figure 1:
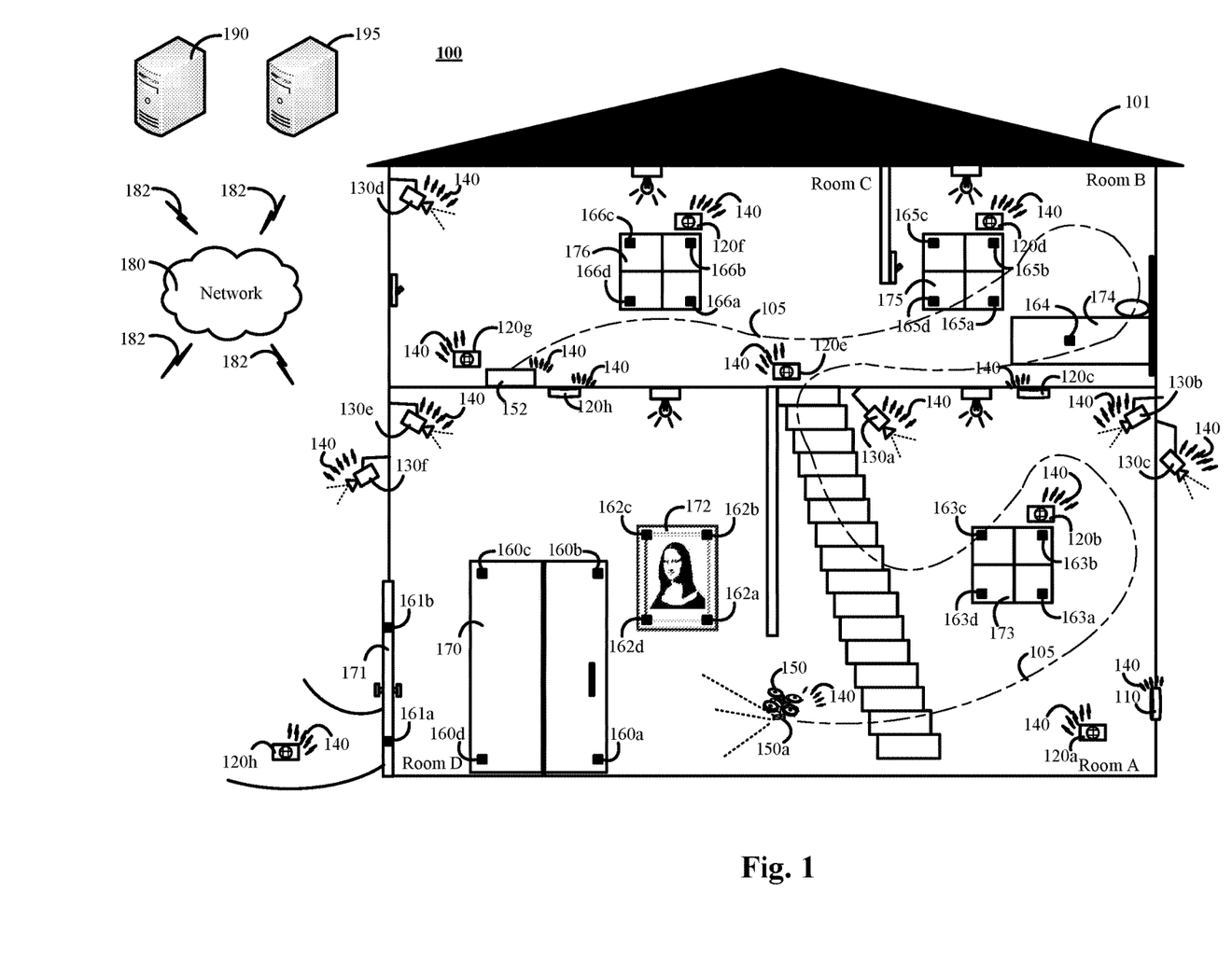
FIG. 1 is a contextual diagram of an example system that deploys a drone to generate a 3D map of a property using data obtained from one or more markers.

FIG. 1 is a contextual diagram of a system 100 that deploys a drone 150 to generate a 3D map of a property 101 using data obtained from one or more markers 160a, 160b, 160c, 160d, 161a, 161b, 162a, 162b, 162c, 162d, 163a, 163b, 163c, 163d, 164, 165a, 165b, 165c, 165d, 166a, 166b, 166c, 166d.

The system 100 may include at least a drone 150 and one or more markers 160a, 160b, 160c, 160d, 161a, 161b, 162a, 162b, 162c, 162d, 163a, 163b, 163c, 163d, 164, 165a, 165b, 165c, 165d, 166a, 166b, 166c, 166d. In some implementations, the system 100 may also be a connected-property (e.g., connected-home) that includes a monitoring system control unit 110, one or more sensors 120a, 120b, 120c, 120d, 120e, 120f, 120g, 120h, one or more cameras 130a, 130b, 130c, 130d, 130e, 130f, a wireless network 140, a drone charging station 152, a network 180, one or more communication links 182, a monitoring application server 190, a central alarm station server 195, or a combination thereof.

The drone 150 may include any type of robotic device that can be equipped with one or more sensors and navigate the property 101. The drone 150 may include, for example, a quad-copter drone, a land-based rover, or the like.

The drone 150 is capable of performing a variety of tasks within a connected-property such as property 101. For example, the drone 150 can surveil the property 101 and use a camera (or other sensors) to gather data associated with the property. Alternatively, or in addition, the drone 150 can respond to potential events detected by the monitoring system control unit 110, the monitoring application server 190, or both, based on sensor data generated by one or more sensors 120a, 120b, 120c, 120d, 120e, 120f, 120g, 120h. Alternatively, or in addition, the drone 150 may navigate to a device with a manual control such as a light switch, a thermostat, an oven, or the like, deploy a deployable arm, and manipulate the manual controls associated with the device. Other types of operations may also be performed by the drone 150.

Performing each of the aforementioned operations requires that the drone 150 be able to navigate the property 101. The drone 150 can navigate the property 101 using a 3D volumetric map of the property.

The drone 150 can generate its own 3D volumetric map of the property 101. For example, the drone 150 may perform a process for generating a 3D volumetric map of the property 101 when the drone 150 is initially integrated into the system 100, and given an instruction to deploy for the first time. Alternatively, or in addition, the drone 150 may perform a process for generating 3D volumetric map of the property 101 should be updated. For example, the drone 150 may be configured to performing the process for generating a 3D volumetric map of the property 101 to update its existing 3D volumetric map of property 101 weekly, monthly, yearly, or the like. Alternatively, or in addition, the drone 150 may perform the process for generating a 3D map of the property 101 in response to an instruction from a user device that instructs the drone 150 to perform a process for generating a 3D volumetric map of the property 101. For example, a user may alter the structure of the property 101 (e.g., knock down a wall), add furniture to 101 (e.g., add a kitchen island), or the like and then instruct the drone 150 to perform the process for generating a 3D volumetric map of the property to update the drone's 150 existing map of the property 101.

The drone 150 includes mapping sensors 150a such as a 3D scanner that can collect data associated with the property 101 that can be used to generate synchronized (e.g., time-stamped) 3D volumetric data representing features of the property 101. In some implementations, mapping sensors 150a may use computer vision techniques to gather data about the property 101 that can be used to generate a 3D volumetric map of the property 101. For example, the mapping sensors 150a may be configured to project light (e.g., visible light or invisible light) onto surfaces, objects, or the like in the property, and then capture reflections of that projected light. The drone 150 may obtain the reflection data captured by the mapping sensors 150a, and use one or more processors to process the reflection data to generate an initial 3D volumetric map of the property 101. Generating the initial 3D volumetric map of the property 101 may include, for example, adding 3D volume to detected structures or objects based on the obtained reflection data. In addition, the mapping sensors 150a may also include one or more cameras that may be configured to capture images of portions of the property. The images that the cameras can capture may include, for example, visual images (e.g., monochrome images, colored images, or the like), infrared images, or the like.

However, in some instances, the drone's 150 mapping sensors 150a may not be able to detect the existence of all naked surfaces, naked objects of the like. For example, the drone's 150 mapping sensors may not be able to detect naked surfaces that do not adequately reflect the light projected by the drone's 150 mapping sensors. Naked surfaces that do not adequately reflect the light projected by the drone's 150 mapping sensors 150a may include, for example, naked surfaces that are transparent such as glass, plastic, or the like. However, naked surfaces that are difficult (and sometimes impossible) for a drone's 150 mapping sensors 150a to detect because of the way that the naked surfaces reflect light are not limited to transparent surfaces. Instead, naked surfaces that are difficult (and sometimes impossible) for a drone's 150 mapping sensors 150a to detect may also include naked surfaces that reflect light in a specular fashion. Naked surfaces that reflect light in a specular fashion may include mirrors, polished surfaces, water, or the like. Similarly, some naked surfaces may reflect the light projected by the drone's 150 mapping sensors 150a in a distorted manner, thereby making their making the surfaces difficult (and sometimes impossible) for a drone's 150 mapping sensors 150a to detect. Accordingly, naked surfaces of the property 101 such as glass walls, glass windows, glass doors, mirrors, polished surfaces, water, or the like may not be adequately detected by the drone's 150 mapping sensors 150a. For purposes of this disclosure, a "naked surface" is meant to describe a surface of a property that does not include any markers.

Alternatively, or in addition, the drone's 150 mapping sensors 150a may be able to detect the presence of certain types of first naked objects but may not be able to distinguish between the first naked object and other naked objects surrounding the first naked object. For example, the drone's 150 mapping sensors 150a may be able to detect the presence of a naked door, but not be able to distinguish the detected naked door from the naked door frame, naked wall, or the like that surrounds the naked door.

To detect naked surfaces or objects, the drone 150 can utilize data obtained from one or more markers 160a, 160b, 160c, 160d, 161a, 161b, 162a, 162b, 162c, 162d, 163a, 163b, 163c, 163d, 164, 165a, 165b, 165c, 165d, 166a, 166b, 166c, 166d installed throughout the property that can be detected by the mapping sensors 150a. For example, the markers 160a, 160b, 160c, 160d may be installed on a sliding glass door 170, the markers 161a, 161b may be installed on a door 171, the markers 162a, 162b, 162c, 162d may be installed on a painting 172, the markers 163a, 163b, 163c, 163d may be installed on a window 173, the marker 164 may be installed on a bed 174, the markers 165a, 165b, 165c, 165d may be installed on a window 175, the markers 166a, 166b, 166c, 166d may be installed on a window 176.

The markers may include visual markers, infrared markers, or the like. In some implementations, the type of marker (e.g., visual marker, infrared marker, or the like) may be determined based on the type of sensors (e.g., visual light sensor, infrared sensor, or the like) used by the mapping sensors 150a to capture images. In some implementations, the markers may include an item that can be seen with the human eye such as a sticker. In such implementations, the marker may be removed after the three-dimensional map generation (or update) process so that the marker does not detract from appearances.

However, in other implementations, the markers may include invisible markers employed using a substantially invisible sticker, substantially invisible ink, substantially invisible ink on a sticker, or the like. Such substantially invisible markers may be put into place so that the marker need not removed after the three-dimensional mapping process is complete. In such implementations, markers could be left on a surface indefinitely without detracting from appearances because the substantially invisible marker is not visible (or not easily visible) to the human eye.

Markers of either kind may be placed onto surfaces by a person at the property. In other implementations, the markers may be installed on a surface (e.g., a glass wall, glass door, glass window, or the like) at the factory of a manufacturer that manufacturers the surface.

The markers may include encoded information that can be obtained by the drone via an analysis of images including the markers and decoded. The encoded information may describe the naked surface (or naked object) on which the marker is installed, the dimensions of the naked surface (or naked object) on which the marker is installed, volumetric dimensions of the naked surface (or naked object), the manner in which light reflects off of the naked surface (or naked object), or the like. The encoded information may be decoded and stored in a map modification data structure, and later used to modify an initial 3D volumetric map of the property 101 generated by the drone's 150 mapping sensors 150*a*. For example, the decoded information may be used to designate surfaces and cause the drone 150 to ignore noise obtained in data collected by the drone's 150 mapping sensors 150*a*, while also noting the location of the surface via the one or more markers.

The drone 150 may navigate the property 101 using the mapping sensors to obtain data about the property 101 using the mapping sensors 150*a*. During this collection of data, the drone 150 may capture (i) 3D volumetric data associated with the property 101 and (ii) images of surfaces, objects, or both that include markers 160*a*, 160*b*, 160*c*, 160*d*, 161*a*, 161*b*, 162*a*, 162*b*, 162*c*, 162*d*, 163*a*, 163*b*, 163*c*, 163*d*, 164, 165*a*, 165*b*, 165*c*, 165*d*, 166*a*, 166*b*, 166*c*, 166*d*. The drone 150 may use onboard computational resources (e.g., processors, memory units, and the like) to generate an initial 3D volumetric map of the property 101 based on the captured 3D volumetric data. In addition, the drone 150 may analyze collected images to identify the existence of one or more markers in the images. The drone's 150 analysis of the images may be performed in real-time, or near real-time, as the images are collected. Alternatively, the drone's 150 analysis of the images may be performed after the collection of data while the drone is offline charging on a charging station.

The drone can obtain data associated with the markers from the images, and save the obtained data in as map modification data. The map modification data may be stored using any type of data structure. In some implementations, the drone may generate a map modification table based on the map modification data. Generating a map modification table may include creating a new map modification table and populating the new map modification table with data obtained from the markers. Alternatively, generating a map modification table may include, for example, populating an existing map modification table with data that is obtained from the markers. The drone 150 may modify the initial 3D volumetric map based on the data maintained in the map modification table.

By way of example, the drone 150 resting on a charging station 152 may receive an instruction to generate a 3D volumetric map of the property 101. The drone 150 may take off on a navigation path 105 and begin scanning the property 101 using the mapping sensors 150*a*. The navigation path 105 is defined by a trajectory that is selected so that the areas of interest within the property 101 are scanned by the mapping sensors 150*a*. The drone 150 can generate an initial 3D volumetric map of the property 101 that does not include the sliding glass door 170, the door 171, the painting 172, the window 173, the bed 174, the window 175, and the window 176. The drone 150 can analyze images collected by the mapping sensors 150*a* to detect the presence of respective markers 160*a*, 160*b*, 160*c*, 160*d*, 161*a*, 161*b*, 162*a*, 162*b*, 162*c*, 162*d*, 163*a*, 163*b*, 163*c*, 163*d*, 164, 165*a*, 165*b*, 165*c*, 165*d*, 166*a*, 166*b*, 166*c*, 166*d*, obtain encoded data from the markers, decode the obtained encoded marker data, and generate a map modification table based on the decoded marker data. The drone 150 may modify the initial 3D volumetric map of the property 101 based on the map modification table to include the sliding glass door 170, the door 171, the painting 172, the window 173, the bed 174, the window 175, and the window 176. The markers 160*a*, 160*b*, 160*c*, 160*d*, 161*a*, 161*b*, 162*a*, 162*b*, 162*c*, 162*d*, 163*a*, 163*b*, 163*c*, 163*d*, 164, 165*a*, 165*b*, 165*c*, 165*d*, 166*a*, 166*b*, 166*c*, 166*d* may be uninstalled (e.g., removed from one or more naked surfaces of the property 101) once the modified 3D volumetric map has been generated.

In the example of FIG. 1, each of the surfaces or objects that were tagged with one or more markers were generally described as stationary objects. However, the present disclosure need not be so limited. For example, one or more moving objects within the property may also be tagged with one or more markers. Examples of moving objects that may be tagged with one or more markers includes, for example, a ceiling fan, a swinging door, cabinet doors, cabinet drawers, or the like. In such instances, the markers associated with the movable objects may be encoded with data that indicates the type of movement, range of movement, periodic intervals of movement, current position of the movable object, current state of the movable object (e.g., open, closed, on, off, or the like), or the like. The drone 150 may use the drone's mapping sensors 150*a* to obtain encoded marker data from the moveable objects, decode the encoded marker data, and store the encoded marker data in a map modification data structure. Then, the data in the map modification data structure can be used to modify an initial 3D volumetric map to account for the moveable objects.

Figure 2A:
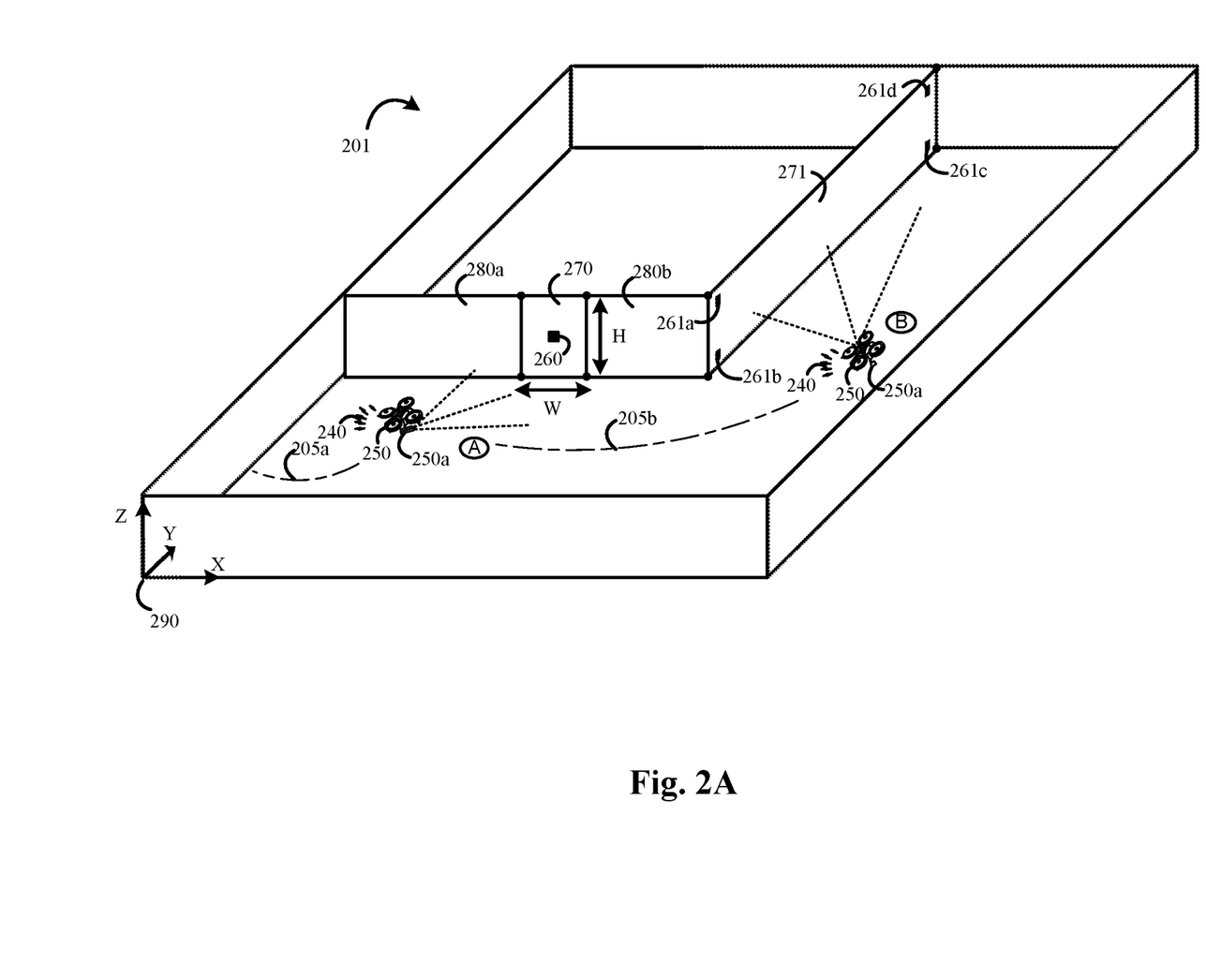
FIG. 2A is a contextual diagram of an example of a drone collecting data used to generate a 3D map of a property using data obtained from one or more markers.

In general, marker data obtained from movable objects may be used to modify an initial 3D volumetric map in the same manner as the marker data obtained from stationary objects. However, marker data obtained from movable objects includes additional information indicating the current FIG. 2A is a contextual diagram of a drone 250 that collects data that can be used to generate a 3D map of a property 201 using data from one or more markers 260, 261*a*, 261*b*, 261*c*, 261*d*. The drone 250 may include mapping sensors 250*a*.

FIG. 2A displays a portion of a property 201 that includes a non-transparent door 270 and a glass wall 271. Prior to instructing a drone 250 to generate a 3D volumetric map of the property 201, a human may install one or more markers 260, 261*a*, 261*b*, 261*c*, 261*d* onto the surfaces of the non-transparent door 270 and the glass wall 271.

The one or more markers may be used in a property 201 in different ways. For example, a single marker may be installed in a single location of an object, surface, or the like. For example, the marker 260 may be installed in the center of the non-transparent door 270. In such instances, the marker 260 may be encoded with information that describes attributes of the door 270 within the context of the property 201. For example, the encoded information may include data that is indicative of the height (H), width (W), or both of the non-transparent door 270. Alternatively, or in addition, the encoded information may include volumetric data associated with the non-transparent door 270. Alternatively, or in addition, the encoded information may include data that identifies the marker 260 as being associated with the non-transparent door 270. Marker identification information may include, for example, a marker number, a marker family, a marker identifier, a marker location, a combination thereof, or the like. The drone 250 may detect the presence of the marker 260, obtain the encoded information, decode the encoded information, and then store the decoded data as map modification data. In some implementations, the stored map modification data can be used to generate or populate a map modification table.

Other ways of installing makers may include installing a plurality of markers around the perimeter of an object, surface, or the like. For example, a plurality of markers 261*a*, 261*b*, 261*c*, 261*d* can each be installed in a respective corner of a glass wall 271. In such instance, a drone 250 may use the location of each respective marker 261a, 261b, 261c, 261d, and their proximity to each other to determine the dimensions of the glass wall 271. Alternatively, or in addition, the respective markers 261a, 261b, 261c, 261d may each include encoded information that describes attributes about the glass wall 271 as described with reference to marker 260.

In some implementations, at least a portion of the map modification table may be created once the markers are installed and the map modification table can be uploaded to the drone 250. An example of an initial portion of the map modification table that can be created and uploaded to the drone 250 is set forth below as Table 1:

TABLE 1

| Marker # | Marker Family | Marker ID | Marker Location |
| --- | --- | --- | --- |
| 1 | Glass Wall | 1 | Up_Left |
| 2 | Glass Wall | 2 | Up_Right |
| 3 | Glass Wall | 3 | Down_Right |
| 4 | Glass Wall | 4 | Down_Left |
| 5 | Door | 1 | Center |

After the markers are installed, the drone 250 may receive an instruction to generate a 3D volumetric map of the property 201. The drone 250 may take off on a navigation path 205 and begin scanning the property 201 using the mapping sensors 250a. The navigation path 205 may be defined by a trajectory that is selected so that the areas of interest within the property 201 are scanned by the mapping sensors 250a.

The drone's 250 mapping sensors 250a may collect 3D volumetric data and images (e.g., visual images, IR images, or the like) of the property 201 while the drone 250 is moving along its navigation path 205 determined by its defined trajectory. The mapping sensors 250a can provide synchronized (e.g., time-stamped) 3D volumetric data and colored or monochrome images. In addition, mapping sensors 250a, other drone 250 equipped sensors, or other external positioning systems (e.g., Ultra Wide Band (UWB), SONAR, Motion Capture Cameras, or the like) can determine the pose of the camera ($P^M\_i$) that is associated with the collected data (e.g., pose associated with the 3D volumetric data, pose associated with each image, or the like). The pose of the camera is the camera's position and orientation with respect to a predetermined coordinate system at the time mapping data is collected by the mapping sensors 250a. The mapping data may include 3D volumetric data, image data, or the like. In a similar manner, the pose of each marker ($T^C\_i$) in an image may also be determined by the drone 250. The pose of the camera, the pose of the marker, or both may be determined with reference to the coordinate axes 290.

In some implementations, if a marker is affixed to a moving object (e.g., a ceiling fan, a swinging door, or the like), the pose of the camera, pose of the marker, or both may be captured for each image of the moving object at each of the moving objects respective locations. For example, the drone's 250 mapping sensors 250a may capture multiple images of the blades of a ceiling fan that include markers. Each respective image of the multiple images may include a snapshot of the blades in a different position. In such instances, the drone 250 may capture, for each image, the pose of the camera, the pose of each marker, or both. This captured data may be added to a map modification data structure. When used to modify an initial 3D volumetric map, the pose associated with moving data objects can be used to establish a volumetric radius of the moving object(s). For example, the marker data obtained from ceiling fan blades can be used to modify an initial 3D volumetric map so that a drone 250 can know to steer clear of the spinning radius of the fan blades.

By way of example, with reference to FIG. 2A, the drone 250 can use the mapping sensors 250a to collect 3D volumetric data and images of wall 280a. Then, at stage A, the drone 250 may obtain an image of non-transparent door 270, analyze the image in real-time or near real-time, and detect that the image includes a marker 260. Alternatively, the drone 250 may analyze the image offline. The drone 250 may read encoded data from the image of the marker 260, decode the encoded data, and identify an entry in a previously generated map modification table that corresponds to the detected marker 260. The drone 250 may obtain the pose of the mapping sensor 250a camera ($P^M\_5$) associated with the image of the property that includes the marker 260. In addition, the drone 250 may obtain the pose of the marker 260 ($T^C\_5$) in the image. The pose of the mapping sensor 250a camera associated with the image of the property that includes the marker 260 and the pose of the marker 260 may be stored in the map modification table in association with the entry for marker 260.

The drone 250 may continue along the navigation path 205b established by the defined trajectory. The drone 250 may obtain 3D volumetric data and images of the wall 280b and turn the corner of the property 201 between the wall 280b and the glass wall 271. At stage B, the drone 250 may obtain one or more images of the glass wall 271, analyze the one or more images in real-time or near real time, and detect that the image includes multiple markers 261a, 261b, 261c, 261d. Alternatively, the drone 250 may analyze the one or more images of the glass wall 271 offline. The drone 250 may read encoded data from the image of the markers 261a, 261b, 261c, 261d, decode the encoded data, and identify an entry in a previously generated map modification table that corresponds to each respective marker 261a, 261b, 261c, 261d. The drone 250 may obtain the pose of the mapping sensor 250a camera ($P^M\_1$, $P^M\_2$, $P^M\_3$, $P^M\_4$) associated with the image of the property that includes each respective marker 261a, 261b, 261c, 261d. The mapping sensor 250a camera pose for each of the respective markers may be the same if multiple makers are capture in the same image. Alternatively, the mapping sensor 250a camera pose for each of marker 261a, 261b, 261c, 261d may be different if each respective marker is captured in a different image. In addition, the drone 250 may obtain the pose of each respective marker 260 ($T^C\_1$, $T^C\_2$, $T^C\_3$, $T^C\_4$) in the image. The pose of the mapping sensor 250a camera associated with the one or more images of the property that includes the markers 261a, 261b, 261c, 261d and the pose of each marker 261a, 261b, 261c, 261d may be stored in the map modification table in association with the corresponding entry for each respective marker 261a, 261b, 261c, 261d. At the completion of stage B, the map modification table includes the following data shown in Table 2:

TABLE 2

| Marker # | Marker Family | Tag ID | Location | Camera Pose in Map Frame | Marker Pose in Camera Frame |
| --- | --- | --- | --- | --- | --- |
| 1 | Glass Wall | 1 | Up_Left | $P^M\_1$ | $T^C\_1$ |
| 2 | Glass Wall | 2 | Up_Right | $P^M\_2$ | $T^C\_2$ |

TABLE 2-continued

| Marker # | Marker Family | Tag ID | Location | Camera Pose in Map Frame | Marker Pose in Camera Frame |
|---|---|---|---|---|---|
| 3 | Glass Wall | 3 | Down_Right | $P^M\_3$ | $T^C\_3$ |
| 4 | Glass Wall | 4 | Down_Left | $P^M\_4$ | $T^C\_4$ |
| 5 | Door | 1 | Center | $P^M\_5$ | $T^C\_5$ |

Markers may also be used to provide visual markers in an otherwise feature-poor area for the purpose of more accurately calculating the drone pose, surface geometry, or the like during the mapping process. These markers serve as additional constraints for the camera pose, surface points, or the like.

Markers can also be used to designate certain geometric constraints in the environment. For example, a marker on the floor might indicate that this surface is the floor, and the drone can expect it to be planar, level and continuous throughout the environment. In another example, two perpendicular walls might be tagged with markers that indicate this geometrical relationship. These additional constraints can stored in a map modification table, and can be used by the drone 250 to identify and interpret the features of the property 201 and improve the accuracy and speed of the mapping process.

The drone 250 can use the map modification table shown in FIG. 2 to modify an initial map of the property 201 that is generated by the drone 250 based on 3D volumetric data. For example, camera pose and the marker pose of one or more images of each respective marker can be used to calculate a pose of each marker in the 3D volumetric map. That is, the pose of each marker in the 3D volumetric map $T^M\_i$ is a function of $P^M\_i$ and $T^C\_i$. Once the map modification table has been fully generated (e.g., populated) for each marker entry, the installed markers may be collected.

Figure 2B:
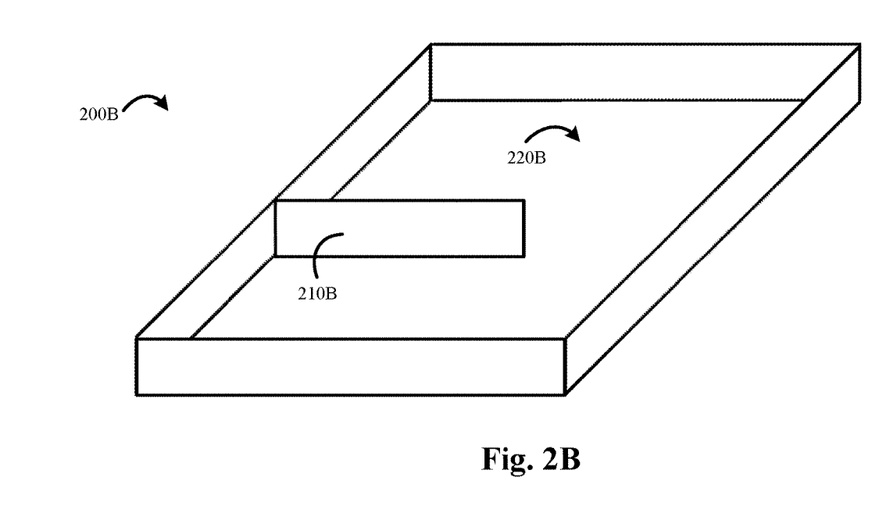
FIG. 2B is a contextual diagram of an example of an initial map that is generated by a drone.

FIG. 2B is a contextual diagram of an example of an initial map 200B that is generated by a drone 250.

The initial map 200B is an example of an initial map that may be generated by a drone 250 for a property 201 shown in FIG. 2A. An initial map may include, for example, a 3D volumetric map of the property 201 that is based on 3D volumetric data collected by the drone's 250 mapping sensors 250a independent of any marker information stored in the map modification table. Other data may be collected in addition to the 3D volumetric data. For example, the drone 250 may obtain timestamps that are indicative of the time of collection of the 3D volumetric data, the pose of mapping sensor 250a, the pose of the drone, the pose of a marker in an image, or the like at the time of collection of the 3D volumetric data is also obtained.

The initial map 200B based on the 3D volumetric data collected by the mapping sensors 250a, the obtained time stamps associated with the 3D volumetric data, the obtained poses associated with the collected 3D volumetric data includes a first wall 210B and an open space 220B. The first wall 210B does not include a feature that corresponds to the non-transparent door 270 that exists in the property 201. The open space 220B does not include the glass wall 271 that exists in the property 201. The non-transparent door 270 and the glass wall 271 are missing from the initial map that is generated based on 3D volumetric data that is collected by the drone's 250 mapping sensors 250a and independent of marker data that is maintained in the map modification table.

Figure 2C:
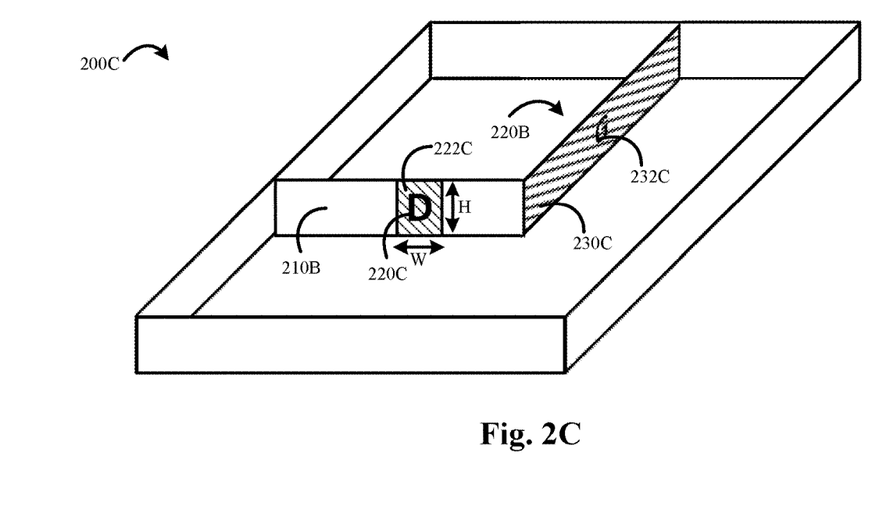
FIG. 2C is a contextual diagram of an example of a modified initial map that has been generated by a drone based on map modification data.

FIG. 2C is a contextual diagram of an example of a modified initial map 200C that has been generated by a drone based on map modification data.

The modified initial map 200C is an example of a modified initial map that may be generated by modifying an initial 3D volumetric map based on map modification data. For example, the drone 250 may use map modification data maintained in a map modification table to modify the initial 3D volumetric map to include features detected through the use of the markers 260, 261a, 261b, 261c, 261d.

In some implementations, the drone 250 may access map modification data to obtain, for each marker, a camera pose in map frame ($P^M\_i$) and a marker pose in camera frame ($T^C\_i$). The drone 250 can determine a pose for each marker in a 3D volumetric map coordinate frame ($T^M\_i$) based on the camera pose in map frame ($P^M\_i$) and a marker pose in camera frame ($T^C\_i$). The drone 250 can then use the pose for one or more markers in a 3D volumetric map coordinate frame to modify the initial 3D volumetric map.

The drone 250 may utilize one or more mapping functions that can be used modify the initial 3D volumetric map. Mapping functions utilized by the drone 250 may include, for example, an add_volume function, an add_label function, or the like. The add_volume function may be configured to receive parameters that include a pose for one or more markers in a 3D volumetric map coordinate frame ($T^M\_i$) and a volumetric attribute (e.g., WallThickness). The drone may execute the add_volume function to modify the initial 3D volumetric map to add a wall on the portions of the initial 3D volumetric map's coordinate system that correspond to the pose for one or more markers in a 3D volumetric map coordinate frame ($T^M\_i$) provided to the add_volume function. For example, a drone 250 can execute an add_volume function such as add_volume ($T^M\_1$, $T^M\_2$, $T^M\_3$, $T^M\_4$, WallThickness) to modify the initial map 200B to include a wall 230C in what was previously an open space 220B. The drone 250 can obtain the pose for each respective markers in a 3D volumetric map coordinate frame $T^M\_1$, $T^M\_2$, $T^M\_3$, $T^M\_4$ by accessing map modification data. The map modification data obtained from the drone's 250 analysis of images of the glass wall 271 with markers 261a, 261b, 261c, 261d installed.

The drone 250 may also be configured to execute an add_label function. The add_label function may be configured to receive parameters that include a pose for one or more markers in a 3D volumetric map coordinate frame ($T^M\_i$), a label, and one or more dimensions for an object (or surface), or a combination thereof. The drone 250 may execute the add_label function to modify the initial 3D volumetric map by altering one or more attributes so that a portion of the wall is labeled based on the parameters input into the add_label function. For example, the drone 250 can execute an add_label function such as add_label ($T^M\_1$, $T^M\_2$, $T^M\_3$, $T^M\_4$, "G") to modify the initial map 200B to include a label "G" which stands for glass, glass wall, or the like as shown in modified initial map 200C. The drone 250 can obtain the pose for each respective markers in a 3D volumetric map coordinate frame $T^M\_1$, $T^M\_2$, $T^M\_3$, $T^M\_4$ by accessing map modification data. In a similar manner, the drone 250 can execute an add_label function such as add_label ($T^M\_1$, W, H, "D") to modify the initial map 200B to include a label "D" 220C which stands for door, doorway, or the like. In addition, the function add_label ($T^M\_1$, W, H, "D") may alter the initial map in a manner 200B so that the labeled door has a surface area 222C corresponding to width (W) and height (H) specified by the data encoded on marker 260 and detected by the drone 250. The pose for the marker in a 3D volumetric map coordinate frame $T^M\_1$, the width (W), and the height (H) may be obtained from stored map modification data such as a map modification table. The add_label function can thus be used to label features on an initial 3D volumetric map that were undetectable by the drone's 250 mapping sensors 250*a*, the drone's camera, or a combination thereof.

In some implementations, an initial map that was generated using the data detected by the drone's 250 mapping sensors may be modified using data stored in a map modification table to account for noise that may have caused distortions in the initial map. In some implementations, such distortions may be caused by the presence of reflective surfaces in the property 201. In some instances, the drone 250 may use marker data obtained, decoded, and stored in the map modification table to not only denote glass surfaces, but also to predict the reflections of integrated or external illuminators and interpret those reflections appropriately. The marker data that has been obtained, decoded, and stored as map modification data include data indicating the angle of reflection of light from the surface, object, or the like. The angle of reflection of light from the surface, object, or the like may help the drone estimate the locations of surfaces, light sources, and the drone itself and update the initial map during the map modification phase accordingly.

Figure 3:
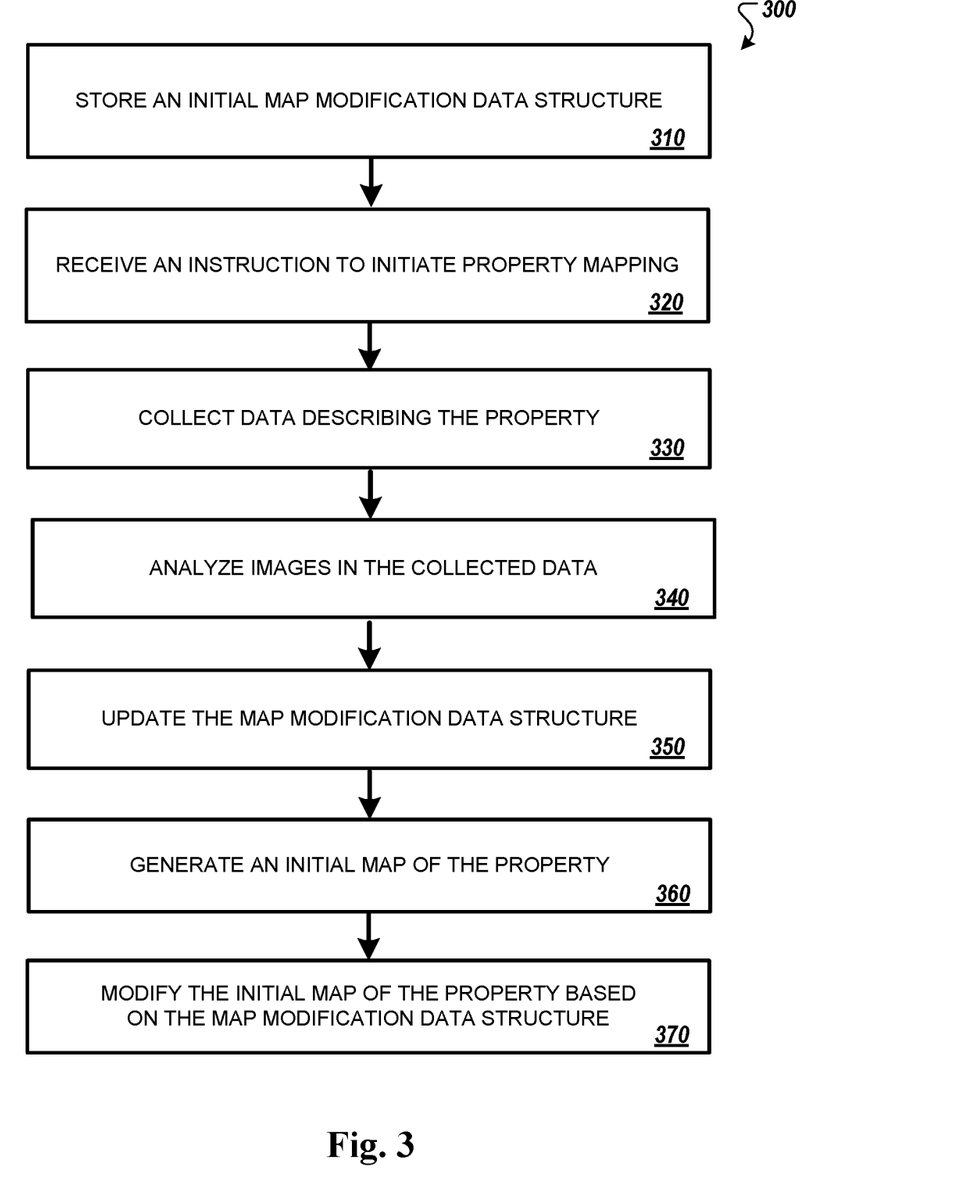
FIG. 3 is a flowchart of an example process for generating a 3D map of a property using data obtained from one or more markers.

FIG. 3 is a flowchart of an example of a process 300 for generating a 3D map of a property using data obtained from one or more markers. In general, the process 300 includes storing an initial map modification data structure 310, receiving an instruction to initiate property mapping 320, collecting data describing the property 330, analyzing images in the collected data 340, updating the map modification data structure 350, generating an initial map of the property 360, and modifying the initial map of the property based on the map modification data structure 370. The process 300 will be described as being performed by a drone such as the drone 250 described with reference to FIGS. 2A-2C.

In more detail, a drone may store 310 an initial map modification data structure. The map modification data structure may include a map modification table that is configured to store data obtained by the drone from one or more markers. The initial map modification data structure may be initialized to store data such as a marker number, a marker family, a marker identifier, a marker location, or the like. The initial map modification data structure may be uploaded to the drone for storage in the drone's memory unit once a particular configuration of markers is finalized for a property. The initial configuration of markers may include, for example, a conceptual configuration of markers that is based on a set of plans for marker installation. Alternatively, the initial configuration of markers may include a final marker configuration after the installation of the markers in a property.

The drone may receive 320 an instruction to initiate property mapping. The instruction may be received from another device such as a user device (e.g., a mobile device), a monitoring system control unit, a monitoring application server, or the like. In other implementations, the instruction may be originated by drone programming. For example, the drone may maintain a calendar that includes scheduled map updates. In response to a determination that a current time satisfies a predetermined time associated with a scheduled update in the calendar, the drone generate an instruction that, when processed by the drone, instructs the drone to initiate property mapping.

The instruction may trigger the drone to obtain a stored trajectory that the drone will use to navigate a path through the property. A trajectory for the navigation path is selected so that the each of the areas of interest within the property are scanned by the drone's mapping sensors. Alternatively, in other implementations, the drone may randomly navigate the property and use the mapping sensors to collect data about the property. Alternatively, in other implementations such as when an existing map of a property is being updated, the drone may navigate the property using an existing map, and then collect data using the mapping sensors that can be used to update the existing map. In yet other implementations, the drone may be remotely controlled by a human user while moving around a property to collect data using mapping sensors that can be used to generate an initial property map.

The drone is configured to collect 330 data associated with the property using the drone's mapping sensors. The mapping sensors may include, for example, a 3D scanner that can collect data associated with a property that can be used to generate a synchronized (e.g., time-stamped) 3D volumetric data of features of the property. Collecting data using the mapping sensors may include use computer vision techniques to gather data about the property that can be used to generate a volumetric map of the property. In addition, the mapping sensors, other drone-equipped sensors, or other external positioning systems (e.g., Ultra Wide Band (UWB), SONAR, Motion Capture Cameras, or the like) can be used to determine the pose of the monitoring sensors that are associated with the collected data (e.g., pose associated with the 3D volumetric data, pose associated with each image, or the like). For example, the mapping sensors may be configured to project light (e.g., visible light or invisible light) onto surfaces, objects, or the like in the property, and then capture reflections of that projected light.

The drone may analyze 340 images of the property that are collected by the drone. In some implementations, the drone may analyze one or more images to determine whether the one or more images include a marker. The drone may analyze the one or more images in real-time, or near real-time. Alternatively, the drone may analyze the one or more images offline after the drone has completed flight, and returned to a dock. In response to the detection of a marker, the drone may obtain encoded data from the marker, and decode the encoded data. In addition, the drone may determine a pose of the marker in the image.

The drone may update 350 the map modification data structure based on the data collected at stage 330 and the results of the image analysis in stage 340. Updating the map modification data structure may include, for example, storing the mapping sensor pose, the marker pose, and the decoded marker data in the map modification data structure. The mapping sensor pose, the marker pose, and the decoded marker data may be stored as data that identifies certain features of the property that were undetectable by the drone's mapping sensors. The map modification data structure may include a table.

The drone may generate 360 an initial map of the property. The initial map of the property may include, for example, a 3D volumetric map of the property that is based on 3D volumetric data collected by the drone's mapping sensors independent of any marker information stored in the map modification table. Other collected data may also be used to generate the initial map of the property. For example, in addition to the 3D volumetric data, the drone may use timestamp that is obtained that is indicative of the time of collection of the 3D volumetric data, the pose of mapping sensor, drone, or the like at the time of collection of the 3D volumetric data is obtained, or the like may each be used to in the generation of the initial map of the property.

The drone may modify 370 the initial map of the property based on the map modification data structure. For example, the drone may access the data maintained by the map modification data structure, and use the data from the map modification data structure to modify the initial map of the property. In particular, the drone may access marker data describing features of the property that cannot be detected by the drone's 3D volumetric mapping sensors to modify the initial map. Using the data stored in the map modification data structure allows the drone to modify the initial map to include objects or surfaces that were not detected by the drone's 3D volumetric scanning system.

Figure 4:
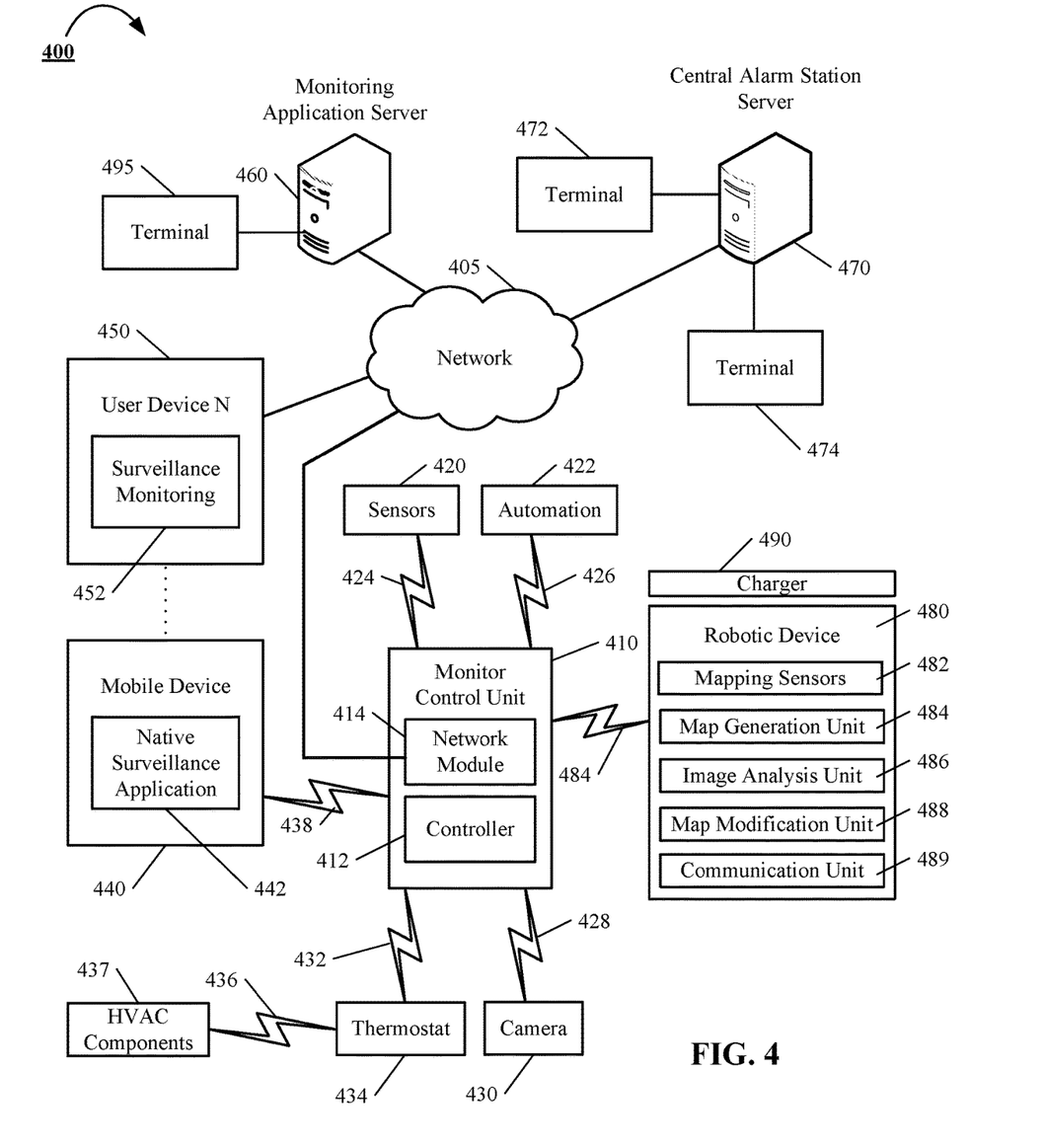
FIG. 4 is a block diagram of components of an example system used for deploying a drone to generate a 3D map of a property using data obtained from one or more markers.

FIG. 4 is a block diagram of components of a system for deploying a drone to generate a 3D map of a property using data obtained from one or more markers.

The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 210. For instance, the module 222 may cause a lighting system to illuminate an area to provide a better image of the area when captured by a camera 230.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring system control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the monitoring system control unit 410 and can control the environmental (e.g., temperature) settings based on commands received from the monitoring system control unit 410.

In some implementations, the thermostat 434 is a dynamically programmable thermostat and can be integrated with the monitoring system control unit 410. For example, the dynamically programmable thermostat 434 can include the monitoring system control unit 410, e.g., as an internal component to the dynamically programmable thermostat 434. In addition, the monitoring system control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes at least one robotic devices 480. The robotic device 480 may be any type of robot that is capable of moving and taking actions that assist in security monitoring, mapping a property, or the like. For example, the robotic devices 480 may include a drone that is capable of moving throughout a property based on automated control technology, user input control provided by a user, or a combination of both. In this example, the drone may be able to fly, roll, walk, or otherwise move about the property. The drone may include a helicopter type device (e.g., a quad copter), a rolling helicopter type device (e.g., a roller copter device that can fly and also roll along the ground, walls, or ceiling), or a land vehicle type device (e.g., an automated car that drives around a property).

The robotic device 480 may include mapping sensors 482, a map generation unit 484, an image analysis unit 486, and a map modification unit 488. The mapping sensors 482 can collect data associated with the property that can be used to generate an initial map of the property. The mapping sensors 482 may include one or more 3D scanners that can use computer vision techniques to obtain volumetric data associated with a property. For example, the mapping sensors 482 may be configured to project light (e.g., visible light or invisible light) onto surfaces, objects, or the like in the property, and then capture reflections of that projected light. The robotic device 480 may obtain the reflection data captured by the mapping sensors 482 and use one or more processors to process the reflection data to generate an initial 3D volumetric map of the property. In addition, the mapping sensors 482 may also include one or more cameras that may be configured to capture images of the portions of the property. The images that the cameras can generate may include, for example, visual images (e.g., monochrome images, colored images, or the like), infrared images, or the like or the like.

The map generation unit 484 can generate an initial map of the property based on 3D volumetric data collected by the mapping sensors 482. The initial map may be generated independent of any marker information. Generating the initial map may include, for example, adding 3D volume to detected structures or objects based on volumetric data obtained by the mapping sensors 482. Other collected data by the mappings sensors 482 may also be used to generate the initial map of the property. For example, in addition to the 3D volumetric data, the robotic device 480 may use obtained timestamp data that is indicative of the time of collection of the 3D volumetric data, the pose of mapping sensor 482, pose of the mapping sensors 482 camera, pose of the marker in an image, or the like at the time of collection of the 3D volumetric data is obtained, or the like may each be used to in the generation of the initial map of the property.

The image analysis unit 486 analyze the images obtained mapping sensors in real-time or near real-time, and detect whether the images include a marker. Alternatively, the robotic device 480 may use the image analysis unit 486 to analyze the images offline. If it is determined that the image includes a marker, the robotic device 480 may use the image analysis unit 486 to read encoded data in the marker from the image of the marker and decode the encoded data. The robotic device 480 can then identify an entry in the portion of the map modification data structure that corresponds to the marker detected by the image analysis unit 486 use the decoded data to update the entry.

The map modification unit 486 may be configured to modify the initial map generated by the map generation unit 484 based on marker data stored in a map modification data structure. In some implementation, the data stored in the map modification data structure can be used, for example, to determine a pose for each marker in a 3D volumetric map coordinate frame ($T^M\_i$) based on the mapping sensors 482 camera pose in map frame ($P^M\_i$) and a marker pose in camera frame ($T^C\_i$). The map modification unit 486 can then use the pose for one or more markers in a 3D volumetric map coordinate frame to modify the initial 3D volumetric map. In some implementations, the map modification unit 468 may use an add_volume function, an add_label function, or the like to modify the initial map.

In some examples, the robotic device 480 can be configured to use the map modified by the map modification unit 486 to automatically navigate within a property. In these examples, the robotic device 480 can include sensors and control processors that guide movement of the robotic device 480 within the property. For instance, the robotic device 480 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic device 480 may include control processors that process output from the various sensors and control the robotic device 480 to move along a path that reaches the desired destination and avoids obstacles. In this regard, the control processors detect walls or other obstacles in the property and guide movement of the robotic device 480 in a manner that avoids the walls and other obstacles.

The robotic device 480 also may include a communication unit 489 that enables the robotic device 480 to communicate with the monitoring system control unit 410 and/or other devices. The communication unit 489 may be a wireless communication module that allows the robotic device 480 to communicate wirelessly. For instance, the communication module may be a Wi-Fi module that enables the robotic device 480 to communicate over a local wireless network at the property. The communication module further may be a 900 MHz wireless communication module that enables the robotic device 480 to communicate directly with the monitoring system control unit 410. Other types of short-range wireless communication protocols, such as Bluetooth, Bluetooth LE, Zwave, Zigbee, etc., may be used to allow the robotic device 480 to communicate with other devices in the property.

The robotic device 480 further may include processor and storage capabilities. The robotic device 480 may include any suitable processing devices that enable the robotic device 480 to operate applications and perform the actions described throughout this disclosure. In addition, the robotic device 480 may include solid state electronic storage that enables the robotic device 480 to store an initial 3D volumetric map of the property generated by the map generation unit 484, a modified 3D volumetric map of the property generated by the map modification unit 488, and one or more machine learning models. Alternatively, or in addition, the robotic device's 480 solid state electronic storage may include applications, configuration data, collected sensor data, collected video data, collected image data, and/or any other type of information available to the robotic device 480.

The robotic device 480 may be associated with a charging station 490. The charging station 490 may be located at predefined home base or reference locations in the property. The robotic device 480 may be configured to navigate to the charging station 490 after completion of tasks needed to be performed for the monitoring system 400. For example, after navigating the property on a predetermined trajectory to collect data using mapping sensors 482 that can be used to generate a 3D volumetric map of the property, the robotic device may be configured to automatically fly to and land on the charging station 490. In this regard, the robotic device 480 may automatically maintain a fully charged battery in a state in which the robotic devices 480 is ready for use by the monitoring system 400.

The charging station 490 may be a contact based charging station and/or a wireless charging station. For contact based charging stations, the robotic device 480 may have readily accessible points of contact that the robotic device 480 is capable of positioning and mating with a corresponding contact on the charging station. For instance, a helicopter type robotic device 480 may have an electronic contact on a portion of its landing gear that rests on and mates with an electronic pad of a charging station when the helicopter type robotic device 480 lands on the charging station. The electronic contact on the robotic device 480 may include a cover that opens to expose the electronic contact when the robotic device 480 is charging and closes to cover and insulate the electronic contact when the robotic device 480 is in operation.

For wireless charging stations, the robotic device 480 may charge through a wireless exchange of power. In these cases, the robotic device 480 need only locate themselves closely enough to the wireless charging station for the wireless exchange of power to occur. In this regard, the positioning needed to land at a predefined home base or reference location in the property may be less precise than with a contact based charging station. Based on the robotic device 480 landing at a wireless charging station, the wireless charging station outputs a wireless signal that the robotic device 480 receives and converts to a power signal that charges a battery maintained on the robotic device 480.

The sensors 420, the module 422, the camera 430, the thermostat 434, and the robotic devices 480 and 482 communicate with the controller 412 over communication links 424, 426, 428, 432, and 481. The communication links 424, 426, 428, 432, and 481 may be a wired or wireless data pathway configured to transmit signals from the sensors 420, the module 422, the camera 430, the thermostat 434, and the robotic device 480 to the controller 412. The sensors 420, the module 422, the camera 430, the thermostat 434, and the robotic device 480 may continuously transmit sensed values to the controller 412, periodically transmit sensed values to the controller 412, or transmit sensed values to the controller 412 in response to a change in a sensed value.

The communication links 424, 426, 428, 432, and 481 may include a local network. The sensors 420, the module 422, the camera 430, the thermostat 434, and the robotic device 480 and the controller 412 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 410. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 460 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410, one or more robotic device 480 the one or more user devices 440, 450, or a combination thereof.

The central alarm station server 470 is an electronic device configured to provide alarm monitoring service by exchanging communications with the monitoring system control unit 410, the robotic device 480, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450, the robotic device 480, and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as wifi, Bluetooth, zwave, zigbee, HomePlug (ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 210, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In other implementations, the system 400 further includes network 405 and the sensors 420, the module 422, the camera 430, the thermostat 434, and the robotic device 480 is configured to communicate sensor and image data to the one or more user devices 440, 450 over network 405 (e.g., the Internet, cellular network, etc.). In yet another implementation, the sensors 420, the module 422, the camera 430, the thermostat 434, and the robotic device 480 (or a component, such as a bridge/router) are intelligent enough to change the communication pathway from a direct local pathway when the one or more user devices 440, 450 are in close physical proximity to the sensors 420, the module 422, the camera 430, the thermostat 434, and the robotic device 480 to a pathway over network 405 when the one or more user devices 440, 450 are farther from the sensors 420, the module 422, the camera 430, the thermostat 434, and the robotic device 480. In some examples, the system leverages GPS information from the one or more user devices 440, 450 to determine whether the one or more user devices 440, 450 are close enough to the sensors 420, the module 422, the camera 430, the thermostat 434, and the robotic device 480 to use the direct local pathway or whether the one or more user devices 440, 450 are far enough from the sensors 420, the module 422, the camera 430, the thermostat 434, and the robotic device 480 that the pathway over network 405 is required. In other examples, the system leverages status communications (e.g., pinging) between the one or more user devices 440, 450 and the sensors 420, the module 422, the camera 430, the thermostat 434, and the robotic device 480 to determine whether communication using the direct local pathway is possible. If communication using the direct local pathway is possible, the one or more user devices 440, 450 communicate with the sensors 420, the module 422, the camera 430, the thermostat 434, and the robotic device 480 using the direct local pathway. If communication using the direct local pathway is not possible, the one or more user devices 440, 450 communicate with the sensors 420, the module 422, the camera 430, the thermostat 434, and the robotic device 480 using the pathway over network 405.

The invention claimed is:

1. A system comprising:
   one or more computing devices; and
   one or more storage devices storing instructions that, when executed by the one or more computing devices, causes the one or more computing devices to perform operations, the operations comprising:
   determining that image data depicts one or more markers, wherein the image data depicts a portion of a property and is collected by a camera mounted to a robotic device;
   based on determining that the image data depicts one or more markers, determining a pose of the camera;
   determining, based on the pose of the camera, that a three-dimensional map of the property should be adjusted to include a label identifying one or more features of the property that is undetectable by (i) the camera or (ii) a mapping sensor of the robotic device; and updating the three-dimensional map to include labels identifying the one or more features of the property.

2. The system of claim 1, wherein the pose of the camera comprises a position and orientation of the camera.

3. The system of claim 1, wherein the three-dimensional map was previously generated by the robotic device using data collected by the mapping sensor.

4. The system of claim 1, wherein the operations further comprise storing a map modification data structure that includes one or more marker identifiers that each have a corresponding object identifier and marker location.

5. The system of claim 1, wherein:

the operations further comprise receiving, from a user device, an instruction configured to instruct the robotic device to initiate property mapping; and determining that the image data depicts the one or more markers comprises determining that the image data depicts the one or more markers in response to receiving the instruction.

6. The system of claim 1, wherein the operations further comprise:

determining that a current time and date satisfies a predetermined time and date, wherein the predetermined time and data represent a condition that, when detected, triggers an instruction to be provided to the robotic device to initiate property mapping.

7. The system of claim 1, wherein the operations further comprise:

in response to determining that the image data describes the portion of the property depicting one or more markers, obtaining encoded data from the image data; and decoding the encoded data to obtain data identifying an entry in a map modification data structure.

8. A method performed by one or more computing devices, the method comprising:

determining that image data depicts one or more markers, wherein the image data depicts a portion of a property and is collected by a camera mounted to a robotic device;

based on determining that the image data depicts one or more markers, determining a pose of the camera;

determining, based on the pose of the camera, that a three-dimensional map of the property should be adjusted to include a label identifying one or more features of the property that is undetectable by (i) the camera or (ii) a mapping sensor of the robotic device; and updating the three-dimensional map to include labels identifying the one or more features of the property.

9. The method of claim 8, wherein the pose of the camera comprises a position and orientation of the camera.

10. The method of claim 8, wherein the three-dimensional map was previously generated by the robotic device using data collected by the mapping sensor.

11. The method of claim 8, further comprising storing a map modification data structure that includes one or more marker identifiers that each have a corresponding object identifier and marker location.

12. The method of claim 8, wherein:

the method further comprises receiving, from a user device, an instruction configured to instruct the robotic device to initiate property mapping; and determining that the image data depicts the one or more markers comprises determining that the image data depicts the one or more markers in response to receiving the instruction.

13. The method of claim 8, further comprising:

determining that a current time and date satisfies a predetermined time and date, wherein the predetermined time and data represent a condition that, when detected, triggers an instruction to be provided to the robotic device to initiate property mapping.

14. The method of claim 8, further comprising:

in response to determining that the image data describes the portion of the property depicting one or more markers, obtaining encoded data from the image data; and decoding the encoded data to obtain data identifying an entry in a map modification data structure.

15. At least one non-transitory computer-readable storage device storing instructions that, when received by one or more computing devices, causes the one or more computing devices to perform operations comprising:

determining that image data depicts one or more markers, wherein the image data depicts a portion of a property and is collected by a camera mounted to a robotic device;

based on determining that the image data depicts one or more markers, determining a pose of the camera;

determining, based on the pose of the camera, that a three-dimensional map of the property should be adjusted to include a label identifying one or more features of the property that is undetectable by (i) the camera or (ii) a mapping sensor of the robotic device; and updating the three-dimensional map to include labels identifying the one or more features of the property.

16. The storage device of claim 15, wherein the pose of the camera comprises a position and orientation of the camera.

17. The storage device of claim 15, wherein the three-dimensional map was previously generated by the robotic device using data collected by the mapping sensor.

18. The storage device of claim 15, wherein the operations further comprise storing a map modification data structure that includes one or more marker identifiers that each have a corresponding object identifier and marker location.

19. The storage device of claim 15, wherein:

the operations further comprise receiving, from a user device, an instruction configured to instruct the robotic device to initiate property mapping; and determining that the image data depicts the one or more markers comprises determining that the image data depicts the one or more markers in response to receiving the instruction.

20. The storage device of claim 15, wherein the operations further comprise:

determining that a current time and date satisfies a predetermined time and date, wherein the predetermined time and data represent a condition that, when detected, triggers an instruction to be provided to the robotic device to initiate property mapping.

* * * * *